US012144771B2

(12) United States Patent
Nelson

(10) Patent No.: US 12,144,771 B2
(45) Date of Patent: Nov. 19, 2024

(54) CABLE-BASED BODY-WEIGHT SUPPORT

(71) Applicant: NUtech Ventures, Lincoln, NE (US)

(72) Inventor: Carl A. Nelson, Lincoln, NE (US)

(73) Assignee: NUtech Ventures, Lincoln, NE (US)

( * ) Notice: Subject to any disclaimer, the term of this patent is extended or adjusted under 35 U.S.C. 154(b) by 0 days.

(21) Appl. No.: 17/883,180

(22) Filed: Aug. 8, 2022

(65) Prior Publication Data

US 2023/0044322 A1 Feb. 9, 2023

Related U.S. Application Data

(60) Provisional application No. 63/231,221, filed on Aug. 9, 2021.

(51) Int. Cl.
*A61G 7/10* (2006.01)

(52) U.S. Cl.
CPC ......... *A61G 7/1015* (2013.01); *A61G 7/1051* (2013.01)

(58) Field of Classification Search
CPC ................ A61G 7/1015; A61G 7/1051; A61H 2201/0192; A61H 2201/149; A61H 3/008; A61H 2201/1652
USPC .............................................................. 5/616
See application file for complete search history.

(56) References Cited

U.S. PATENT DOCUMENTS 2,546,688 A * 3/1951 Cullen ................ A61G 7/1015 5/86.1
2,871,915 A * 2/1959 Hogan .................. A61H 3/008 D24/188
2,962,730 A * 12/1960 Carnes ................ A61G 7/1051 254/7 R
3,349,411 A * 10/1967 Eaton .................. A61G 7/1055 4/564.1
3,750,199 A * 8/1973 Spivey ................ A61G 7/1015 5/85.1
4,256,098 A * 3/1981 Swan ................ A62B 35/0093 5/81.1 R (Continued)

OTHER PUBLICATIONS

Frey et al., "A Novel Mechatronic Body Weight Support System," *IEEE Transactions on Neural Systems and Rehabilitation Engineering*, 14(3): 311-321 (Sep. 2006).

(Continued)

*Primary Examiner* — Justin C Mikowski
*Assistant Examiner* — Alison N Labarge
(74) *Attorney, Agent, or Firm* — Leydig, Voit & Mayer, Ltd.

(57) ABSTRACT

An overhead support system includes a plurality of posts; a plurality of beams configured to connect to and span between the posts; a counterbalance system configured to be attached to the plurality of posts; a harness configured to be worn by and support a patient; a plurality of pulleys configured to be disposed on the plurality of posts; a plurality of cables, each cable including a first end configured to be operatively connected to the harness and a second end configured to be operatively connected to a counterbalance system, each cable passing over one of the pulleys; and a mechanism configured to selectively adjust a tension in at least one of the plurality of cables to support some or all of the weight of the patient. The counterbalance system compensates to maintain support while the patient is located between the posts and the harness is lower than the pulleys.

13 Claims, 8 Drawing Sheets

(56) References Cited

U.S. PATENT DOCUMENTS

| | | | | | |
|---|---|---|---|---|---|
| 4,805,248 | A * | 2/1989 | Lunau | A61G 7/1051 | 5/89.1 |
| 5,369,821 | A * | 12/1994 | Richards | A61G 7/1094 | 5/81.1 R |
| 5,456,655 | A * | 10/1995 | Morris | A61G 12/005 | 5/81.1 R |
| 6,006,377 | A * | 12/1999 | Asakawa | A61G 7/1042 | 5/81.1 R |
| 6,241,215 | B1 * | 6/2001 | Gersemsky | A61G 7/1042 | 254/362 |
| 6,321,398 | B1 * | 11/2001 | Wang | A61G 7/1046 | 5/81.1 R |
| 6,637,610 | B1 * | 10/2003 | Cheeseboro | A61G 7/1042 | 212/327 |
| 7,381,163 | B2 | 6/2008 | Gordon et al. | | |
| 9,987,188 | B1 | 6/2018 | Diao | | |
| 10,238,318 | B2 | 3/2019 | Wu et al. | | |
| 10,265,565 | B2 * | 4/2019 | Jue | A63B 69/0064 | |
| 11,135,112 | B1 * | 10/2021 | Winfree | A61H 3/008 | |
| 2002/0026130 | A1 * | 2/2002 | West | A61H 1/0262 | 601/23 |
| 2005/0115914 | A1 * | 6/2005 | Chepurny | B66D 3/22 | 212/328 |
| 2007/0004567 | A1 * | 1/2007 | Shetty | A61H 3/008 | 482/69 |
| 2009/0077737 | A1 * | 3/2009 | Dyhr | A61G 7/1015 | 5/85.1 |
| 2010/0270252 | A1 * | 10/2010 | Chepurny | A61G 7/1061 | 212/76 |
| 2011/0296608 | A1 * | 12/2011 | Victor | A61G 7/1074 | 5/83.1 |
| 2012/0018689 | A1 * | 1/2012 | Chepurny | A61G 7/1015 | 254/342 |
| 2014/0223661 | A1 * | 8/2014 | Galloway | A61G 7/1078 | 5/85.1 |
| 2014/0259391 | A1 * | 9/2014 | Karlsson | A61G 7/1073 | 5/85.1 |
| 2014/0352058 | A1 * | 12/2014 | Sverdlik | A61G 7/1044 | 5/81.1 HS |
| 2017/0027803 | A1 * | 2/2017 | Agrawal | A61B 5/1122 | |
| 2018/0055715 | A1 * | 3/2018 | Vallery | A63B 21/4009 | |
| 2018/0214329 | A1 * | 8/2018 | Mitchell | A61G 7/1046 | |
| 2019/0076313 | A1 * | 3/2019 | Choi | A61G 7/1015 | |
| 2020/0230005 | A1 * | 7/2020 | Hidler | A61G 7/1042 | |
| 2020/0323725 | A1 * | 10/2020 | Kao | A61H 1/005 | |
| 2021/0069052 | A1 * | 3/2021 | Burke | A62B 35/0081 | |
| 2021/0290463 | A1 * | 9/2021 | Dubois | A61G 7/1042 | |

OTHER PUBLICATIONS

Hidayah et al., "Cable-driven systems for robotic rehabilitation." *Soft Robotics in Rehabilitation*, Academic Press, 135-163 (2021).

Shinde, "Cam-Based Pose-Independent Counterweighting for Partial Body-Weight Support in Rehabilitation," Master's Thesis, Univ. of Nebraska, 113 pp (Dec. 2017).

Stienen et al., "Freebal: Design of a Dedicated Weight-Support System for Upper-Extremity Rehabilitation," *J. of Medical Devices*, 3(041009), 9 pp. (Dec. 2009).

Vallery et al., "Multidirectional Transparent Support for Overground Gait Training," 2013 *IEEE 13th International Conference on Rehabilitation Robotics (ICORR)*, IEEE, 7 pp. (2013).

* cited by examiner

CABLE-BASED BODY-WEIGHT SUPPORT

CROSS-REFERENCE TO A RELATED APPLICATION

This application claims priority under 35 U.S.C. § 119(e) to U.S. Provisional Application No. 63/231,221, filed Aug. 9, 2021, and incorporated herein by reference in its entirety.

BACKGROUND

Individuals with physical disabilities and chronic conditions often require intensive rehabilitation to improve function, cardiorespiratory fitness, and quality of life. Stroke is a leading cause of long-term disability in adults with approximately 15 million individuals worldwide and about 795,000 in the United States experiencing a stroke annually. Approximately 80% of survivors experience difficulties moving their limbs. The extent of resulting disability is impacted by multiple factors including timing and intensity of rehabilitation services. Ensuring safe rehabilitation spaces for those with impaired mobility is critical, particularly given their elevated injury risk due to falls, which are the most prevalent cause of fatal injury and nonfatal trauma-related hospital admissions among elderly.

Manual patient handling (for example, lifting or moving) of those lacking physical mobility is the greatest risk factor for overexertion injuries among nursing staff and workers in assistive care facilities, with musculoskeletal injury rates 2 to 5 times the national average. Rehabilitation physical therapists (PTs) are at risk due to challenges associated with repetitively lifting/supporting patients during therapy. Up to 91% of PTs will experience a work-related musculoskeletal disorder, with common factors across studies including transferring, lifting, unanticipated sudden patient fall/movement, and assisting patients during gait activities. Following injury, PTs most commonly leave the neurology and rehabilitation (42%) specialty areas, draining critical expertise needed to care for older adults and others with mobility limitations.

Based on this evidence, technology that addresses the physical needs of those with impaired mobility (including the elderly) and those caring for them may be helpful. Ensuring safe mobility and safe patient handling may significantly improve quality of life while reducing a cost that exceeds $10 billion annually in the United States.

SUMMARY

One or more embodiments of the present disclosure provides an overhead support system. The overhead support system includes a plurality of posts disposed within a space; a plurality of beams configured to connect to and span between the plurality of posts; a counterbalance system configured to be fixedly attached to the plurality of posts; a harness configured to be worn by and support a patient; a plurality of pulleys configured to be disposed on the plurality of posts; a plurality of cables, each cable comprising a first end configured to be operatively connected to the harness and a second end configured to be operatively connected to a counterbalance system, each cable passing over one of the plurality of pulleys; and a mechanism configured to selectively adjust a tension in at least one of the plurality of cables to vary the amount of support provided by the support system between 0 and 100% of the weight of the patient. The counterbalance system compensates to maintain the amount of support while the patient is located between the posts and the harness is lower than the plurality of pulleys.

DETAILED DESCRIPTION

Figure 1:
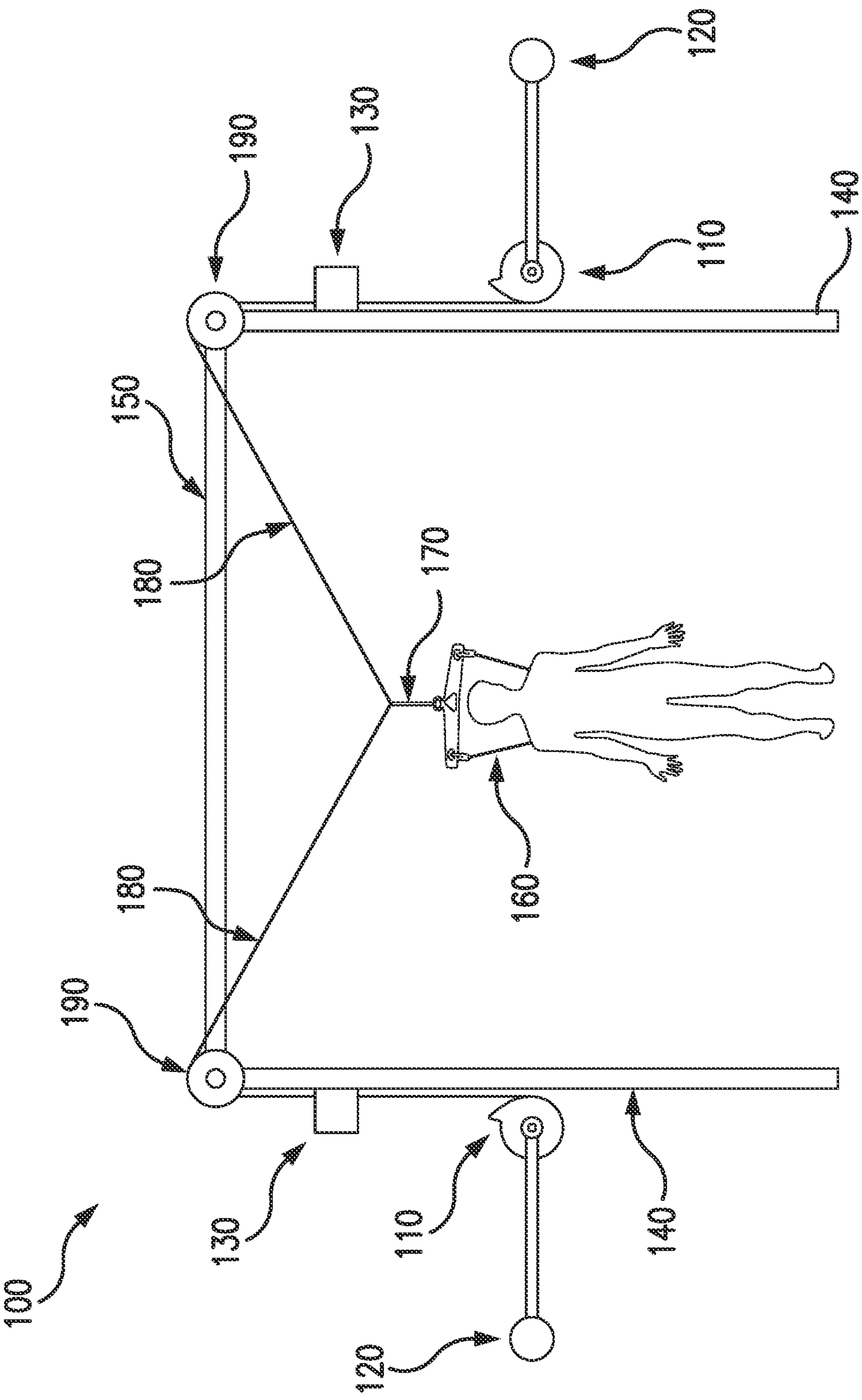
FIG. 1 provides a two-dimensional view of a cable-based support system with passive cam/counterweight tension according to one or more embodiments of the present disclosure.

Relative to the present disclosure, a novel Reconfigurable Independent Support Environment (hereinafter, RISE) system that mechanically supports patients' partial body weight may facilitate rehabilitation, allow for unrestricted patient movement throughout therapy spaces, integrate a fall-arresting mechanism, and scale to various room sizes and configurations. In one or more embodiments, RISE may: 1) reduce risk of fall-related injuries in therapeutic environments used by the elderly and individuals with mobility limitations; 2) lighten physical demand placed on healthcare workers to reduce risk of musculoskeletal injury; and 3) promote healthy levels of activity in the elderly and those with disability through safe mobility, thus decreasing co-morbidities arising from inactivity.

RISE may provide body-weight support and/or fall-arresting functionalities in a uniform fashion throughout a volume such as a therapy gym or occupational therapy room (i.e., clinical/rehabilitation space). RISE may also be used in home settings (for example, independent and assisted living settings) and skilled nursing environments.

There exists a strong body of evidence that shows how falls and lifting injuries pose a growing, unmet health challenge to those with limited mobility (including the elderly) and healthcare workers, respectively, not adequately addressed by current technology. In the long term, broad adoption of RISE may have a cascading and multiplicative effect in reducing these significant healthcare burdens.

The following section outlines advantages that may make RISE unique and able to succeed where other technologies have failed to adequately address issues in the healthcare industry, including issues mentioned above.

In the clinical and rehabilitation environment, therapy equipment is often accompanied by overhead body-weight support (BWS) devices. For example, several versions of overhead gantries exist: passive gantries allowing straight-line motion, passive two-degree-of-freedom gantries allowing full range of motion in an open room space, and robotically driven gantries.

A common disadvantage of these BWS devices is that these devices have limited range of coverage and do not scale well for different room sizes. Gantries support load at a point that varies across one or more beams. As the span of the beam (i.e., room size) increases, the stress in the beam scales up and the beam cross section must increase, meaning that there is no single standard for the design of the gantry structure, and the cost of these systems does not scale well from small to larger rehabilitation spaces. Although fixed trajectory overhead support gantries can be found in some facilities, these scaling issues represent a critical deficiency that has kept the more fully functional gantries (robotic or passive) from being widely adopted. Additionally, if a space is remodeled or if patient flow patterns change (for example, therapy mats replace walking areas or staircases move), these systems may no longer address patient needs in the space.

Mobile body weight support devices, another variant of BWS devices found in limited clinical use, are space-consuming to store, difficult to navigate within small spaces, and can hinder the capacity of a clinician to easily facilitate movement. Other existing BWS devices include passive overhead suspension frames/walkers and robotically-mobilized frames/walkers. Unfortunately, these bulky systems get in the way of performing activities of daily living by preventing close approach to objects such as tables/chairs because these frames/walkers surround the user (i.e., the patient). These systems can also obstruct line of sight of cameras used for documenting movement function (for example, gait, transfers) during rehabilitation. Further, many BWS systems do not sustain support across activities performed at different heights (for example, ascending stairs).

One or more embodiments of the disclosed overhead support system may overcome the challenges posed by current technology. RISE may provide both BWS and fall-arresting functionalities in a uniform fashion throughout a 3-dimensional (3D) space such as a physical and/or occupational therapy gym. RISE may be used to equip an entire space like a therapy gym with a cable system based on stability principles from the domain of cable-suspended robots. RISE may enable use with a typical BWS harnesses used in conjunction with other aforementioned rehabilitation and/or lifting devices to ensure backward compatibility and cost-efficiencies in facilities that already have harnesses. To stay unobtrusive and affordable, RISE may include a counterbalance system that can be tuned to passively compensate for variable BWS as needed for individualized patient needs, as well as providing an independent fall-arresting feature. Thus, RISE may provide a passive, statically balanced 3D cable system for body-weight support.

In addition to the statically-balanced cable design of RISE, the RISE system may improve on current technology because RISE may address multiple unmet needs (for example, prevention of falls and caregiver injuries) in a single system while allowing full use of the entire therapeutically-relevant space. In contrast, existing BWS systems may allow only areas under a fixed path or support device. Due to modular design, RISE may be easily installed and adaptable to rooms of different sizes and shapes (without taking up a lot of space) so that value scales well from small to larger rehabilitation spaces. Based on these characteristics, RISE may circumvent all major identified barriers to adoption/use. Specifically, RISE may cover the entire used space without need to predetermine key pathways, scale well across room sizes and patient anthropometrics (weight/height), support various therapy activities (for example, transfers, walking/balancing, treadmill/elliptical use), and may be hands-free and "always present." Although cable robots may be well known in literature, passive statically balanced cable-suspended systems have not been developed. Therefore, RISE may be novel in terms of both mechanical design and application to rehabilitation.

Figure 2:
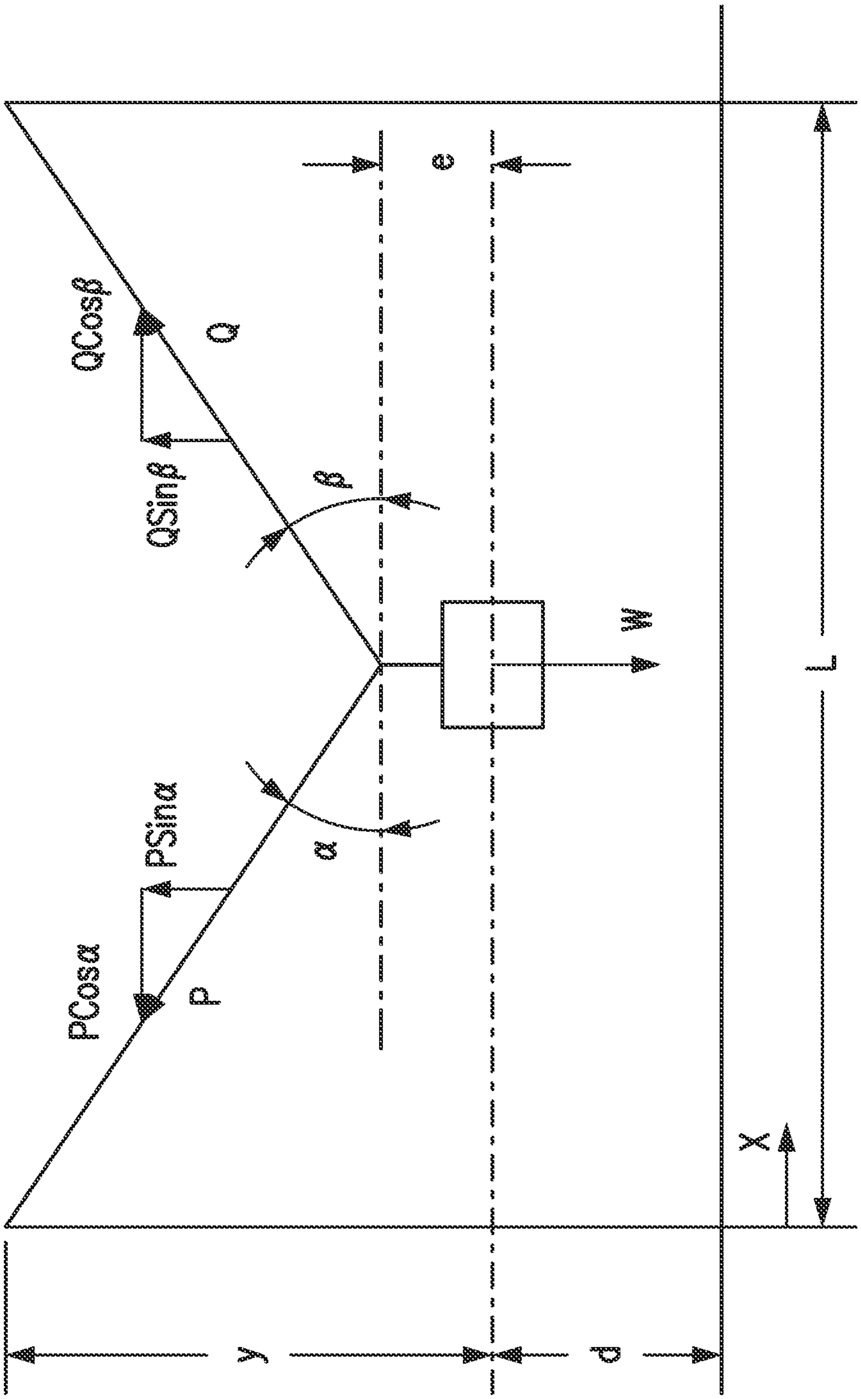
FIG. 2 provides a simplified parametric model of a cable-based support system like the one shown in FIG. 1 according to one or more embodiments of the present disclosure.
Figure 3A:
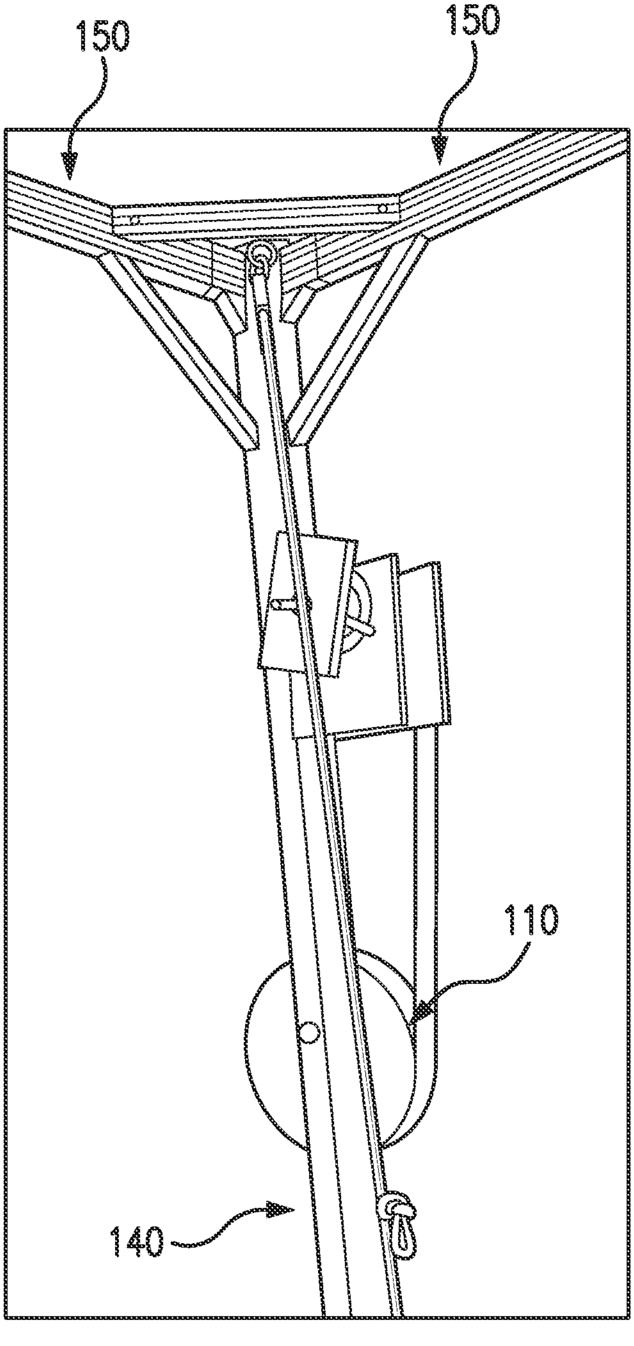
FIG. 3A shows a portion of a cam-based counterweight system according to one or more embodiments of the present disclosure.
Figure 3B:
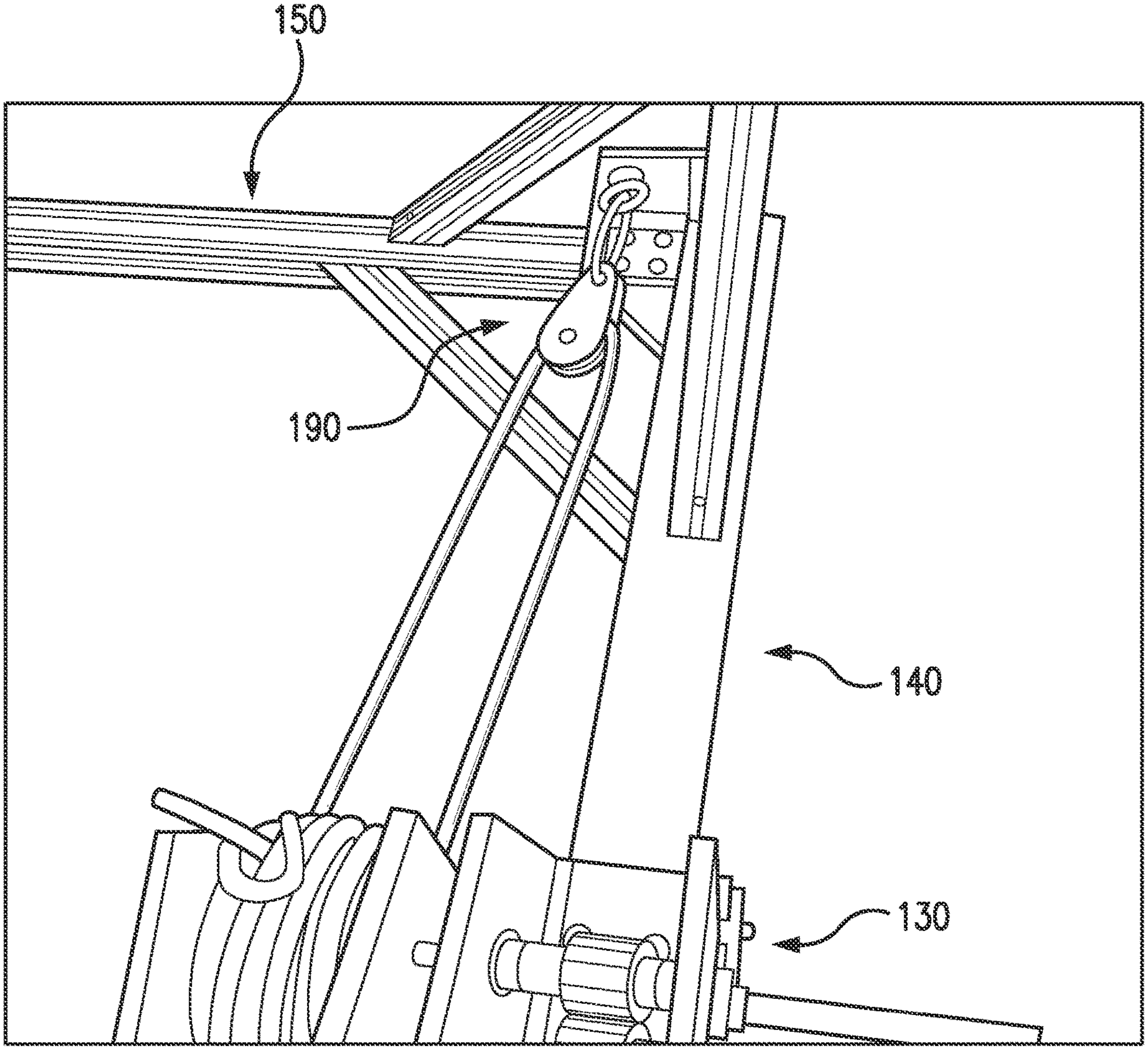
FIG. 3B shows a motion-scaling gearbox of a cam-based counterweight system according to one or more embodiments of the present disclosure.

Basic analysis for a two-cable support device that remains in equilibrium at all positions within its workspace has been shown. With a planar system of two cables suspended from two anchoring points, one may fully balance a load vertically while maintaining zero net force on the payload horizontally (see, for example, FIGS. 1 and 2). Necessary cable tensions may be related through a nonlinear function that can be "programmed" mechanically, without any actuators or control, only using stored energy to counterbalance the payload (that is, the weight, or fraction of the weight, of the patient). Static balancing may be applied in a variety of systems using springs, counterweights, and other means. As one example shown in FIG. 1, a cam 110 with a torsional counterweight 120 as a function generator to map the nonlinear relation between cable tension and cable displacement such that equilibrium is maintained. The counterweight 120 applies force to the cam 110, which scales that force nonlinearly. A gearbox 130 may further linearly scale force and displacement such that the counterweight travel distance produces cable displacements sufficient to cover the entire space. The cam shape may be determined through optimization. A prototype was built and validated based on that model (FIGS. 3A and 3B).

FIG. 1 shows a cable-based support system 100 concept with passive cam/counterweight tension control. The cable-based support system 100 structure may include a plurality of posts (or columns) 140 used to support one or more beams 150, the combination of posts 140 and beams 150 providing the fixed structure of the cable-based support system 100 that includes a suspended harness 160 that is connected via a drop-down cable 170 to one, two, or more support cables 180, each support cable connected to a respective pulley 190 disposed along a post 140 at a height that is above the height of the drop-down cable 170. As seen in FIG. 1, the posts 140 are oriented vertically while the beams 150 are oriented horizontally. However, other orientations are contemplated provided that the combination of posts and beams provide a structure to support the cable-based support system 100. As is also shown in reference to FIG. 2, which shows a simplified parametric model such as may be applied to FIG. 1, designed to produce a nonlinear force-displacement relationship in its two support cables, a patient is suspended from the harness and the weight of the patient (represented by W in FIG. 2) is supported by the support cables.

The resulting force required to maintain the patient in an upright position can be adjusted, i.e., the supporting force provided to the harness by the support cables, can be adjusted such that the patient is either completely supporting themselves, all the way to supporting the entire weight of the patent by the cables, or anywhere in between. The support force provided by the cables, which as can be seen in FIG. 2 depends on the vertical component of cable tension, is selectively adjustable based on the cam 110 and counterweights 120 selected, and also the gearbox 130. Advantageously, the patient is free to move about the space between the posts (within distance L in FIG. 2), with the mechanisms of the counterweight 120, cam 110, and pulleys 190 adjusting its tension to maintain a constant support force on the patient harness 160 irrespective of the angles alpha and beta (as shown in FIG. 2) formed between the cables and the posts, which will change as the patient moves about the room.

More specifically, cables 180 as illustrated in a force diagram in FIG. 2 may have tensions P and Q and may make angles alpha (a) and beta ((3), respectively, with the horizontal. The weight W of the patient in the harness 160 acts vertically downward. Given static equilibrium, the weight W (or fraction of the weight) of the patient is balanced by the sum of the upward components of the cable tensions, namely, $P \sin \alpha + Q \sin \beta$. The horizontal components of the tensions, $P \cos \alpha$ and $Q \cos \beta$ are equal in magnitude and oppositely directed. Note that the center of gravity of the patient's weight is shown located a distance y below the pulleys and a distance d above the floor. The distance between the supporting posts 140 is L. The harness 160 attaches to the cables 180 a distance e above the center of gravity of the patient. Solutions may be within the space between the posts 140 and where the cables 180 intersect (for example at the top of the harness or a drop down cable) is below the pulleys 190.

FIG. 3 shows a cam-based counterweight system (FIG. 3A) and its motion-scaling gearbox (FIG. 3B). The cam-based counterweight system includes posts 140 and beams 150 as well as cams 110, gearboxes 130, and pulleys 190 along with other components discussed herein.

Testing showed reasonable agreement between actual counterbalancing performance and the theoretical model, with differences attributable to non-idealized factors such as friction. Based on the success of the cam system, one may extend these design principles to the RISE system design covering the 3D space and implementing improvements to make the RISE design user-friendly, as described below.

In one or more embodiments, RISE may include a modular body-weight support system suitable for unobtrusive installation in rehabilitation therapy environments of various sizes and shapes.

In a cable-based overhead support system in accordance with the disclosure, which uses cams 110 to mechanically encode the nonlinear load-displacement relationship (see, for example, FIGS. 1 and 2), with counterweights 120 to provide a load scaling appropriate to the needs of the user (that is, the patient), a drawback of the cable-based overhead support system that uses cams 110 and counterweights 120 is the relatively large size and weight of the cams and counterweights. In one or more embodiments, RISE may refine the system concept by storing potential energy in springs 405 instead of counterweights 120. Thus, RISE may be more compact than a cam and counterweight system and facilitate modularity of installation in different spaces. In one or more embodiments, the nonlinear mapping of the cam may be replaced by using a system of springs attached at different orientations. The springs may take the place of both the cam and the counterweight. In an analogy to overhead garage doors, the springs may be located in out-of-the-way space such as along the corner uprights or in overhead space and pretensioned to match user needs using a simple winch motor 415, as shown in FIG. 4A.

Figure 4A:
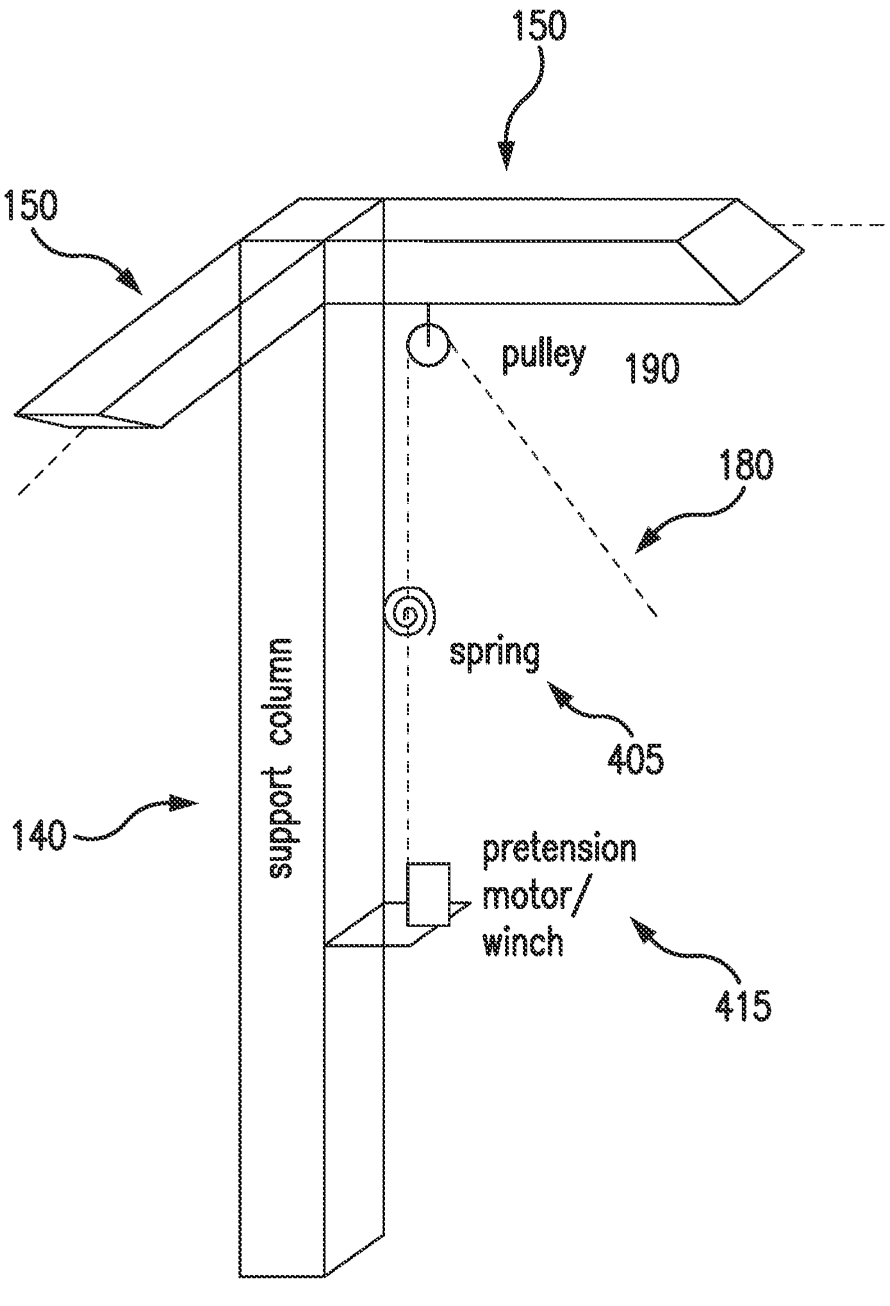
FIG. 4A shows a simplified layout of a RISE corner according to one or more embodiments of the present disclosure.

By adjusting preload in the system using the pretension motor 415 (as shown in the example in FIG. 4A, the body-weight support can be adjusted from 0 to 100%. The RISE system can accommodate various individual heights without affecting equilibrium conditions, since height adjustment can be accounted for in the single adjustable drop-down cable to the harness 160 (as in FIG. 1) as opposed to the entire system of overhead cables 180. A gradient-based constrained optimization technique may be used to solve for optimal spring parameters to maintain equilibrium. Such optimization techniques are available in commercially available software, for example, MATLAB. In general, the static force system may remain stable even without anchoring the structure, provided the vertical BWS loading is inside the footprint of the four corners of the structure.

Figure 4B:
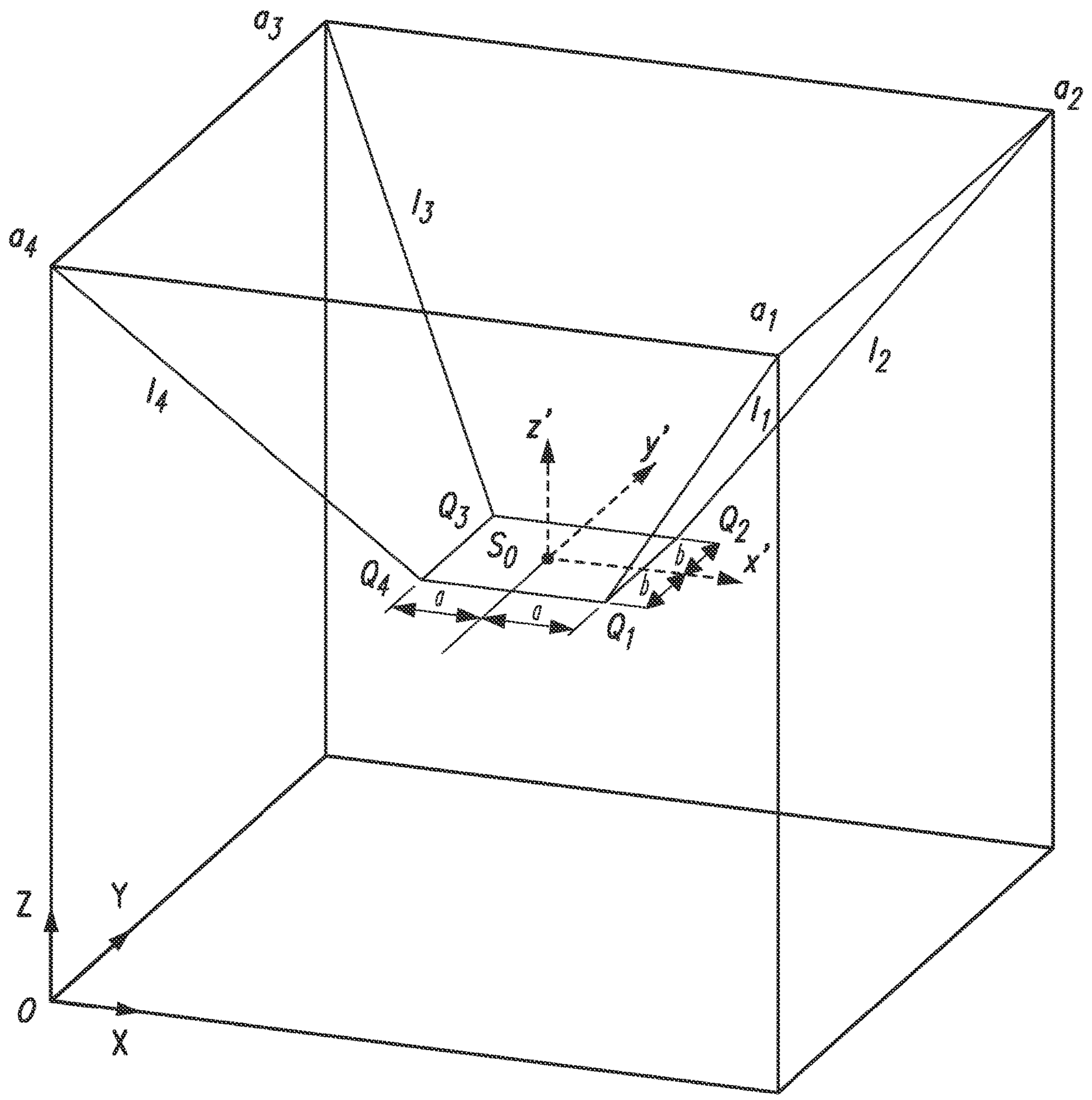
FIG. 4B shows a cable-suspended payload according to one or more embodiments of the present disclosure.
Figure 4C:
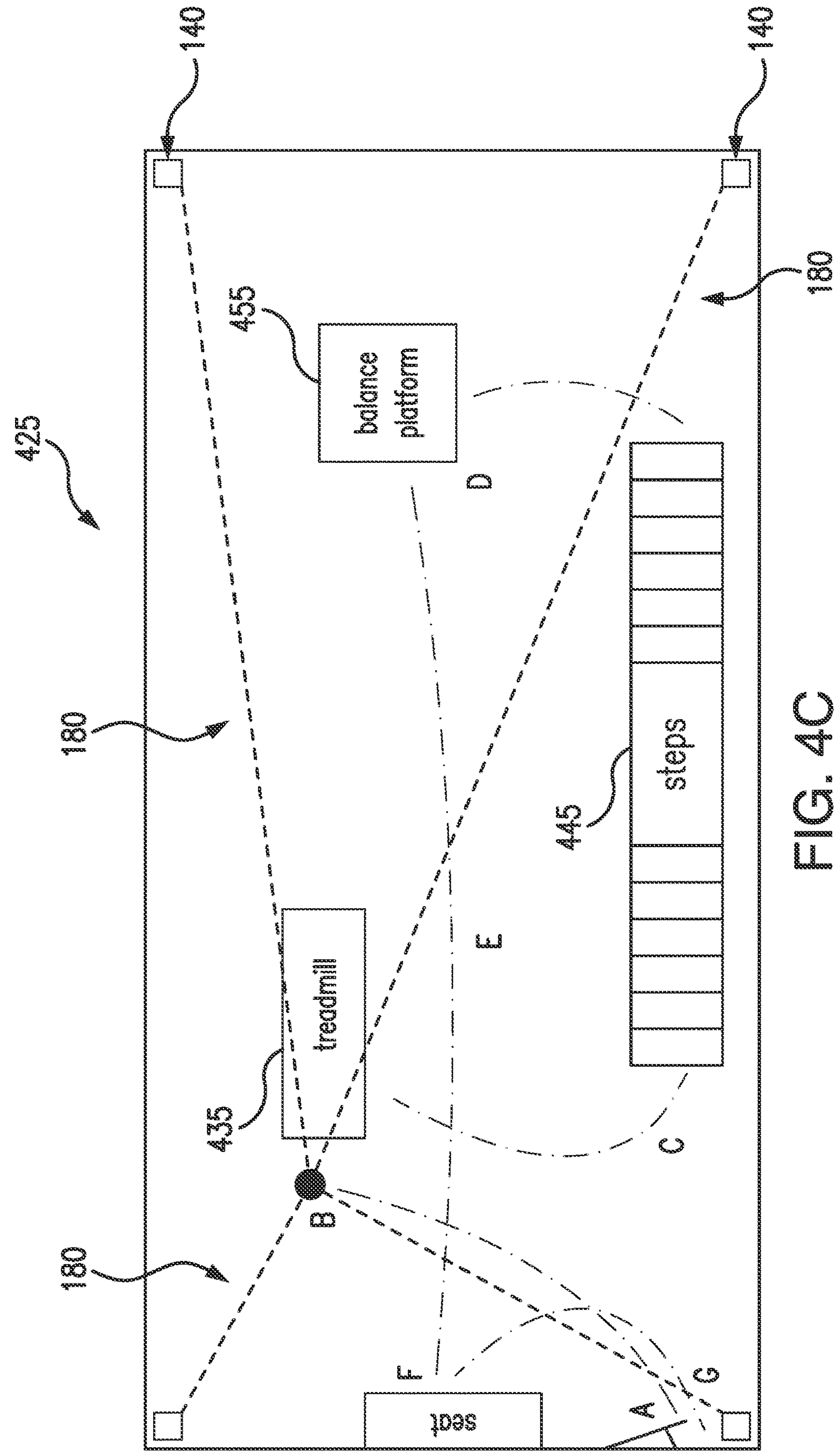
FIG. 4C shows a therapy scenario using a cable-based body-weight support system using springs according to one or more embodiments of the present disclosure.

FIG. 4A illustrates a simplified layout of a corner support arrangement in accordance with the RISE system. FIG. 4B illustrates a cable-suspended payload arrangement wherein points $Q_i$ reduce to a single point in the proposed design. The single point, which is where a patient harness 160 can be suspended, is shown as point B in an exemplary therapy scenario 425 as shown in FIG. 4C, where the dot-dash lines illustrate a patient path of motion during therapy and dashed lines illustrate cables 180 suspending the patient through the patient harness 160 (shown in FIG. 1) at point B.

In an exemplary treatment scenario, a patient may enter a treatment room (at A) and don a harness 160 (see FIG. 1) suspended by support cables 180. The support may be calibrated to the needs of the patient, for example, by adjusting the support force provided to keep the patient upright, which support force may be anywhere between zero and the entire weight of the patient that is suspended by the harness 160. Patient and clinician may walk to the treadmill 435 for locomotor training (B). After rest, patient and clinician practice overground walking and stair negotiation 445 (C), then use balance platform 455 (D). Patient walks quickly using cane (E). Vitals assessed while standing and seated (F). Patient returns to entry, doffs harness and sits in wheelchair (G).

In one or more embodiments, the force-equilibrium model may account for the 3D position of the payload (i.e., the supported body weight). In a two-cable system, the equilibrium analysis is planar, limiting therapeutic applications. In order to support personal mobility in 3D space, the single-variable function derived in the work shown in FIGS. 1 and 2 needs to become a multi-variate surface (taking x- and y-position as inputs and providing cable tensions as outputs). The planar (i.e., two-dimensional) modeling approach may be extended to develop a set of equations representing equilibrium conditions in three dimensions.

Referring to the generic cable-suspended representation in FIG. 4B, which is similar in architecture to the proposed RISE system, tensile forces in cables may be summed and the resultant force vector projected onto the x, y, and z axes, setting the x and y components equal to zero and setting the z component equal to a constant in order to generate equilibrium equations. Since there are multiple locations that are the same distance from a particular corner, springs connected only to ground are insufficient to establish equilibrium conditions. To address this insufficiency, springs whose extension is driven by the difference in displacement of different sets (for example, pairs) of cables can also be used. Simulation results show that, using only a few linear springs, one can achieve approximate equilibrium to within RMS error less than 7% of the BWS vertical offload amount measured throughout the workspace.

FIG. 4B shows four cables with lengths $l_1$ to $l_4$ attached at points $\varrho_1$ to $\varrho_4$, respectively, to surface $S_0$, representing attachment to a mass (for example, a patient) at multiple points. A harness, as discussed herein, may be used to provide a single point through which the cables act. The cables may act through pulleys that are attached to posts, or the intersections of posts and beams, at points $a_1$ to $a_4$.

Furthermore, when varying height dynamically (for example, sit-to-stand or climbing steps), cable angle effects and cable displacement effects largely cancel out, resulting in less than 10% change in vertical BWS (i.e., less than 5 pounds (lbs) if providing 25% BWS for a 200 lb patient) and less than 2% resultant horizontal force (i.e., typically less than 1 lb of "imperfect equilibrium" horizontally). In one or more embodiments, spring orientations may be varied to minimize this error by introducing nonlinear kinetostatic effects. Equilibrium conditions may dictate that the cable tensions decrease with cable extension, thus shallower cable angles may correspond to lower tension. Our simulations have shown that even with relatively low ceilings the cable tensions do not exceed twice the offloaded weight (i.e., less than 100 lbs if providing 25% BWS for a 200 lb patient), thus well within the 5,000 lb safety threshold of the cable. Since the system is passively counterbalanced and carries low inertia, dynamic activities may be readily accommodated without needing a control system.

Certain constraints may be addressed by RISE in order to advance rehabilitation care meaningfully. In one or more embodiments, RISE may consider the practical constraints of cost, installation, maintenance, and scalability. In one or more embodiments, RISE may be applied flexibly across a wide spectrum of use cases. Further, RISE may use standardized off-the-shelf components and favor safety and simplicity. A simple framework as, for example, in FIGS. 3A and 3B can be installed with posts/beams of any length to fit the room footprint. Unlike gantry-type devices, in one or more embodiments, the stress in the structure for this design may not scale up with the span of the workspace, so the structural components (for example, posts and beams) can be standardized regardless of room size, and take up very little footprint. Since loading in the structural members of RISE may be primarily axial rather than bending, RISE setup may be modular; only the spanning lengths may need to be adjusted. However, the span cross-sections may not need to be re-sized. A larger space can be easily subdivided for multiple user-zones by simply adding more upright units (see, for example, FIG. 5). Even though each zone may accommodate a single BWS user, the overhead (out-of-the-way) nature of the RISE cable system may allow multiple people to be within a zone simultaneously.

Figure 5:
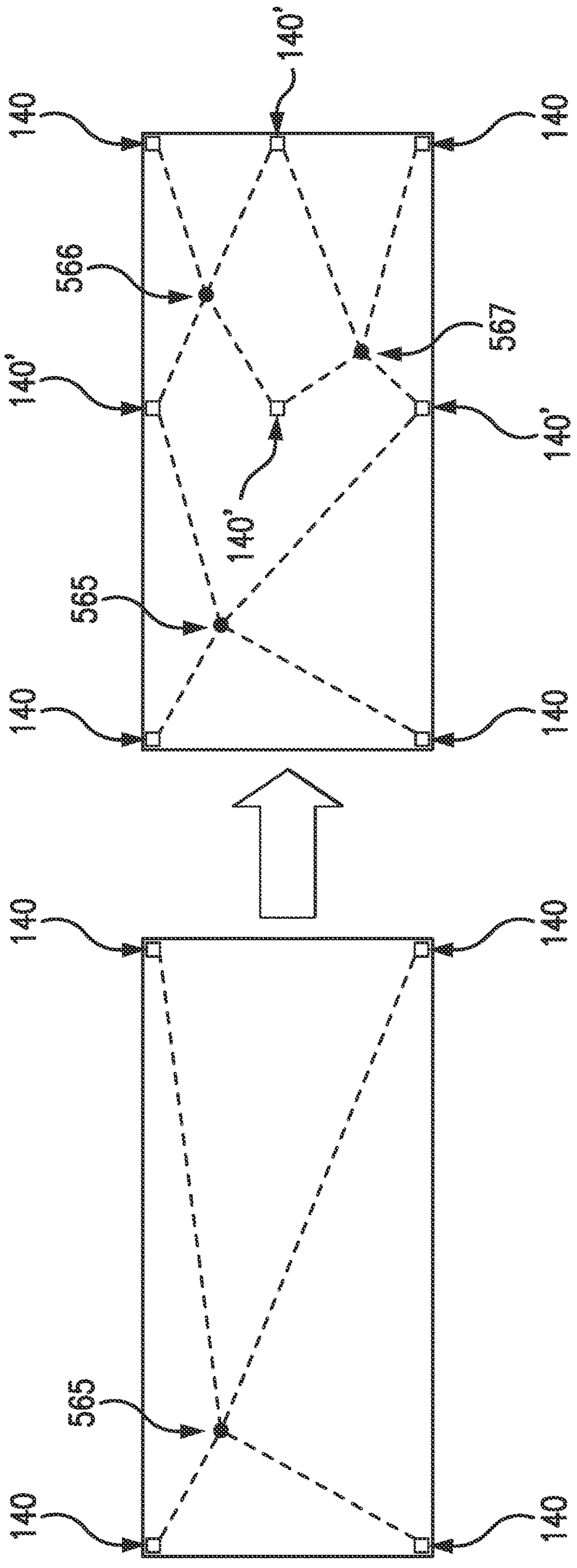
FIG. 5 shows an ease of reconfiguration of a cable-based body-weight support system according to one or more embodiments of the present disclosure.

FIG. 5 illustrates schematic diagrams of two different configurations that can be used in the same space to accommodate more than one patient simultaneously. As can be appreciated, in one exemplary embodiment, four posts 140 (shown in the corners of the room configuration on the left) can be used to support a single patient 565 (black dot in the area of the room). By adding four more posts 140' (grey rectangles, as viewed from above in the plan view of the room shown on the right), two additional patients 566, 567 can be accommodated in the same room. More specifically, the three patients 565-567 (represented by the black dots) can each be supported by four cables (represented by dashed lines) extending between the patient and four posts disposed around the area of activity of each patient. In this embodiment, each patient can move anywhere within a rectangle or polygon defined by the four posts onto which the cables supporting the patent extend. As can be appreciated, in the event two posts are used the patient can move along a line connecting the two posts. When three posts are used, the patient can move in a generally circular area that includes the three posts.

In one or more embodiments, RISE may use standardized parts, for example, springs, to suit the range of properties determined through optimization. However, off-the-shelf parts may come in discrete versions. If standard springs have properties sufficiently close to those desired, then standard springs may be used, recognizing that some margin for imperfect operation may be acceptable. In one or more embodiments, custom springs and/or components may be specified. In all cases, assessment of sensitivity of predicted system performance to the variation from nominal as-optimized parameters may be performed.

It is contemplated that changes in BWS with changes in height (for example, during stair navigation) may be too large. In one or more embodiments, an actively controlled tensioner may be used in place of the winch motor shown in FIG. 4A. An actively controlled tensioner may reduce changes in BWS with changes in height off the floor (for example, during stair navigation) by treating the BWS level as a constant control set-point.

Safety with RISE is enhanced by maintaining low cable tensions and low overall energy storage. Further, any release of spring energy may be contained to the column locations under a protective cover.

In one or more embodiments, RISE may implement distinct modes of operation for serving as a fall-arrester and as a weight-offload system for patient lifting.

The RISE system may address needs related to both fall prevention and BWS, with additional benefits of encouraging safe mobility. For patient-lifting applications, the counterbalance design described under above may provide a standard principle of operation. Adjusting the pretension of the coil springs may fine-tune the amount of BWS to suit the need; springs may be located along the corner uprights to facilitate clinician adjustment using, for example, a single pendant-type controller, though other controllers may be used. In one or more embodiments, hardware may produce the desired performance in this operating mode, and improve ease of adjusting the offload amount for lifting different patients. RISE may be compatible with existing slings/harnesses common in rehabilitation/therapy settings for easy integration.

For arresting falls, the need may be different. Rather than concern with cable tensions, the important quantities may be cumulative cable displacement and rate. In normal operation, some cables may be lengthening while others are shortening. For example, refer to diagram in FIGS. 1 and 2. As a user moves left, the left cable shortens while the right cable lengthens. This is broadly true when moving through the 3D workspace as well; a subset of cables shortens while another subset lengthens. A solution which responds to fall rate may be akin to safety brakes found in elevator cars and automotive seat belt arresters—a centrifugal governor that applies braking force based on speed—but with the added feature of a differential. By routing support cables through a common differential device that can add/subtract input speeds depending on configuration, the centrifugal brake can be activated automatically when all cables are lengthening at a speed that exceeds a pre-set threshold, indicating a fall. The threshold may be set to allow therapeutically anticipated simultaneous shortening of all support cables that could occur (for example, stair descent or transfer from standing to ground). This can be accomplished with an entirely passive mechanical system—no motors, sensors, control systems, or other costly/complex components.

In one or more embodiments, RISE may detect a fall event as a lengthening of all cables, and the fall-arresting mechanism can be triggered automatically (without sensors)

through a mechanical "cumulative extension threshold" based on the sum of all cable extension lengths (for example, "measured" using a pulley system through which all cables pass, similar to a block-and-tackle). Motion of the "block" beyond a certain threshold may engage a spring or stop-block that serves as a fall-arrester (regardless of the rate of fall). For sit-to-stand or other maneuvers that involve purposeful lengthening/shortening of all cables, the threshold can be adjusted (using, for example, the pendant controller).

In one or more embodiments, centrifugal brakes may be applied to each support cable separately.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (for example, "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An overhead support system comprising:

a plurality of posts disposed within a space;

a plurality of beams configured to connect to and span between the plurality of posts;

a counterbalance system configured to be fixedly attached to the plurality of posts;

a harness configured to be worn by and support a patient;

a plurality of pulleys configured to be disposed on the plurality of posts; and a plurality of cables, each cable comprising a first end configured to be operatively connected to the harness and forming during operation an angle greater than 0° and less than 90° with the horizontal and a second end configured to be operatively connected to a counterbalance system, each cable passing over one of the plurality of pulleys, wherein the counterbalance system is further configured to selectively adjust a tension in at least one of the plurality of cables to vary the amount of support provided by the support system between 0 and 100% of the weight of the patient, wherein the counterbalance system compensates to maintain the amount of support while the patient is located between the posts and the harness is lower than the plurality of pulleys using a nonlinear relation between cable tension and cable displacement.

2. The system of claim 1, wherein the harness further comprises a drop-down cable comprising a top end configured to connect to the plurality of cables and a bottom end configured to connect to the harness.

3. The system of claim 1, wherein the counterbalance system comprises:

a plurality of cams, each cam configured to be disposed on one of the plurality of posts and operatively connected to one of the plurality of cables; and a plurality of counterweights, each counterweight operatively connected to one of the plurality of cams and applying a torque to the cam, wherein each cam, without actuators or active control, is further configured to vary a tension in a respective cable to maintain the amount of support.

4. The system of claim 3, wherein the counterbalance system further comprises a plurality of gearboxes, each gearbox configured to be disposed on one of the plurality of posts and to operatively couple one of the plurality of cables to a respective cam, wherein each gearbox is configured to linearly scale force and displacement of the respective cable.

5. The system of claim 1, wherein the counterbalance system comprises:

a plurality of springs, each spring configured to connect one of the plurality of cables to a respective winch, each respective winch being fixedly disposed on one of the plurality of posts.

6. The system of claim 5, wherein the counterbalance system further comprises a winch motor associated with each winch.

7. The system of claim 5, wherein the counterbalance system further comprises a plurality of actively controlled tensioners, each actively controlled tensioner associated with one of the plurality of winches and configured to vary support as a function of patient vertical position.

8. The system of claim 7, wherein each actively controlled tensioner treats the amount of support as a constant control set-point.

9. The system of claim 1, wherein the counterbalance system compensates in a three-dimensional space between the plurality of posts wherein the first end of each cable is below a height of the respective pulley.

10. The system of claim 1, wherein the system is stable without being anchored to an external structure.

11. The system of claim 1, wherein the system is modular.

12. The system of claim 1, the system further comprising a fall arrester, the fall arrester comprising a centrifugal governor that applies a braking force to each of the plurality of cables as a function of cable speed.

13. The system of claim 12, wherein the fall arrester further comprises a differential device through which at least two of the plurality of cables pass, the differential device configured to activate the centrifugal governor when each of the plurality of cables in lengthening at a cable speed that exceeds a preset threshold.

* * * * *